US011530730B2

United States Patent
Ito et al.

(10) Patent No.: US 11,530,730 B2
(45) Date of Patent: Dec. 20, 2022

(54) SEAL MEMBER AND SHOCK ABSORBER

(71) Applicant: KYB Corporation, Tokyo (JP)

(72) Inventors: Kiyoaki Ito, Aichi (JP); Naohide Takimoto, Gifu (JP)

(73) Assignee: KYB CORPORATION, Tokyo (JP)

(*) Notice: Subject to any disclaimer, the term of this patent is extended or adjusted under 35 U.S.C. 154(b) by 14 days.

(21) Appl. No.: 16/978,034

(22) PCT Filed: Mar. 12, 2019

(86) PCT No.: PCT/JP2019/010079
§ 371 (c)(1),
(2) Date: Sep. 3, 2020

(87) PCT Pub. No.: WO2019/176959
PCT Pub. Date: Sep. 19, 2019

(65) Prior Publication Data
US 2020/0408271 A1    Dec. 31, 2020

(30) Foreign Application Priority Data

Mar. 13, 2018 (JP) .............................. JP2018-045033

(51) Int. Cl.
F16F 9/36    (2006.01)
F16F 9/19    (2006.01)
B60G 13/08   (2006.01)

(52) U.S. Cl.
CPC .............. *F16F 9/362* (2013.01); *F16F 9/19* (2013.01); *B60G 13/08* (2013.01); *B60G 2202/24* (2013.01); *B60G 2206/41* (2013.01); *B60G 2206/73* (2013.01); *B60G 2800/162* (2013.01); *F16F 2222/12* (2013.01); *F16F 2224/0241* (2013.01); *F16F 2230/30* (2013.01); *F16F 2232/08* (2013.01); *F16F 2234/02* (2013.01)

(58) Field of Classification Search
CPC ...... F16F 9/36; F16F 9/362; F16F 9/19; F16F 2222/12; F16F 2224/0241; F16F 2230/30; F16F 2232/08; F16F 2234/02; B60G 2202/24; B60G 2206/41; B60G 2206/73; B60G 2800/162
See application file for complete search history.

(56) References Cited

U.S. PATENT DOCUMENTS 3,097,893 A * 7/1963 White .................. F16J 15/3284
                                                384/151
3,582,166 A * 6/1971 Reising ................ F16C 33/201
                                                384/213
(Continued)

FOREIGN PATENT DOCUMENTS

EP    1074760 A2 *  2/2001  .............. F16F 9/362
JP    2010-265954 A  11/2010

*Primary Examiner* — Robert A. Siconolfi
*Assistant Examiner* — James K Hsiao
(74) *Attorney, Agent, or Firm* — Rabin & Berdo, P.C.

(57) ABSTRACT

A seal member includes a base portion held by a cylinder, the base portion being configured such that a rod is inserted through the base portion, and a lip portion provided on the base portion, the lip portion being brought into sliding contact with an outer circumference of the rod, wherein the lip portion is formed of an elastic body containing fibers oriented in the axial direction of the rod.

5 Claims, 2 Drawing Sheets

(56) References Cited

U.S. PATENT DOCUMENTS

| | | | | |
|---|---|---|---|---|
| 3,804,479 | A * | 4/1974 | Butzow | F16C 33/201 384/300 |
| 3,868,097 | A * | 2/1975 | Taylor | F16F 9/362 267/124 |
| 4,916,749 | A * | 4/1990 | Urban | F16C 33/20 384/298 |
| 5,143,765 | A * | 9/1992 | Maier | B29C 70/58 215/379 |
| 6,883,649 | B2 * | 4/2005 | Lun | F16F 9/3242 188/267 |
| 2003/0035602 | A1 * | 2/2003 | Shobert | F16C 33/28 384/298 |
| 2003/0226635 | A1 * | 12/2003 | Fish | B29C 70/025 156/173 |
| 2004/0126041 | A1 * | 7/2004 | Bickle | F16C 33/201 384/276 |
| 2005/0000770 | A1 * | 1/2005 | Oba | B62K 25/04 188/381 |
| 2007/0190108 | A1 * | 8/2007 | Datta | A61L 27/56 424/423 |
| 2009/0140496 | A1 * | 6/2009 | Otani | F16F 9/36 277/562 |
| 2012/0063707 | A1 * | 3/2012 | Pasino | F16F 9/36 384/16 |
| 2012/0306132 | A1 * | 12/2012 | Bordignon | F16J 15/3236 267/124 |
| 2014/0167380 | A1 * | 6/2014 | Ogura | B62K 25/08 280/276 |
| 2014/0216872 | A1 * | 8/2014 | Kani | F16J 15/3204 188/322.16 |
| 2016/0273583 | A1 * | 9/2016 | Iwata | F16C 33/201 |
| 2019/0072150 | A1 * | 3/2019 | Kull | F16F 9/512 |
| 2019/0154151 | A1 * | 5/2019 | Arikawa | F16F 9/363 |

* cited by examiner

SEAL MEMBER AND SHOCK ABSORBER

TECHNICAL FIELD

The present invention relates to a seal member and a shock absorber.

BACKGROUND ART

Seal members for closing a gap between a cylinder and a rod in a fluid pressure apparatus such as a shock absorber, etc. have been known (JP2010-265954A). In a seal member disclosed in JP2010-265954A, a base portion formed of a metallic material is held by the cylinder, and lip portions formed of an elastic body, such as a rubber material, etc., are provided on the base portion so as to be in sliding contact with the rod.

SUMMARY OF INVENTION

In the seal member disclosed JP2010-265954A, an improvement in a wear resistance is required for the lip portions. In order to improve the wear resistance of the lip portions, it is considered to form the lip portions by using an elastic body having a high hardness.

However, the elastic body having a high hardness also has a high modulus of elasticity. Thus, if the lip portions are formed by using the elastic body having the high hardness, the modulus of elasticity of the lip portions is increased, and therefore, a tightness of the lip portions against the rod is increased. As a result, a friction between the lip portions and the rod is increased, and there is a risk in that the smooth movement of the rod is interfered.

An object of the present invention is to improve a wear resistance of a lip portion without interfering smooth movement of a rod.

According to an aspect of the present invention, a seal member that is provided in a fluid pressure apparatus including a cylinder and a rod inserted into the cylinder so as to be movable in an axial direction and that for closing a gap between the cylinder and the rod, includes a base portion held by the cylinder, the base portion being configured such that the rod is inserted through the base portion, and a lip portion provided on the base portion, the lip portion being brought into sliding contact with an outer circumference of the rod, wherein the lip portion is formed of an elastic body containing fibers oriented in the axial direction.

DESCRIPTION OF EMBODIMENTS

A seal member 100 according to an embodiment of the present invention will be described below with reference to the attached drawings.

Figure 1:
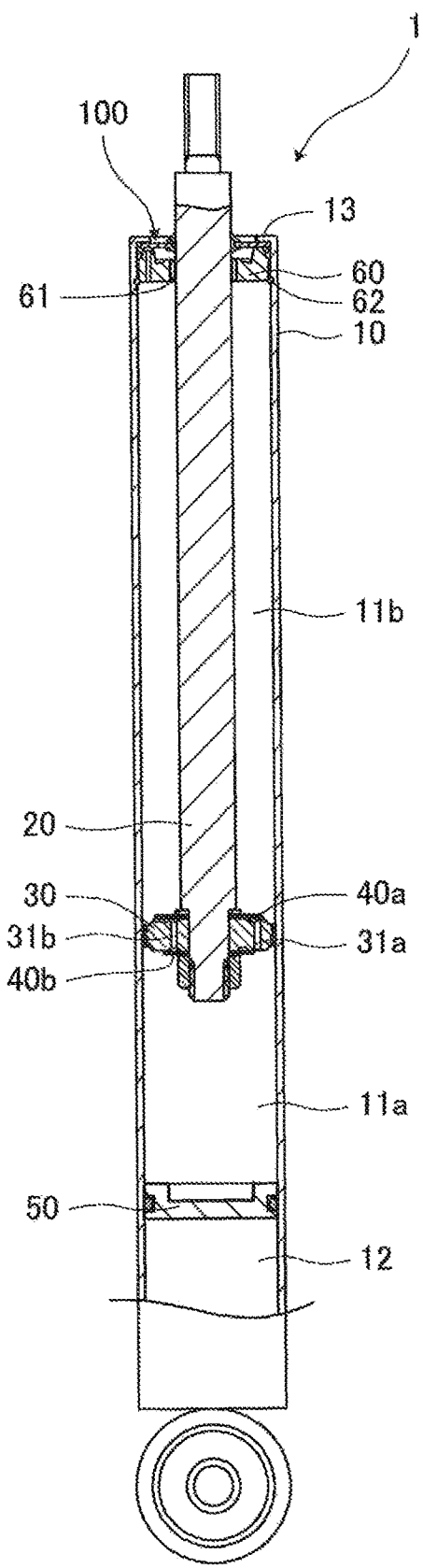
FIG. 1 is a partial sectional view of a shock absorber to which a seal member according to an embodiment of the present invention can be applied.

FIG. 1 is a partial sectional view of a shock absorber 1 serving as a fluid pressure apparatus that is applicable to the seal member 100. The shock absorber 1, for example, is provided between a vehicle body and an axle shaft of a vehicle (not shown) to generate a damping force and suppress vibration of the vehicle body.

The shock absorber 1 includes a cylinder 10; a rod 20 that is inserted into the cylinder 10 so as to be freely movable; and a piston 30 that is connected to the rod 20. The piston 30 is received in the cylinder 10 so as to be freely slidable, and partitions an interior of the cylinder 10 into a contraction-side chamber 11a and an extension-side chamber 11b. The contraction-side chamber 11a and the extension-side chamber 11b are filled with working oil serving as working fluid.

The piston 30 is formed with contraction-side passages 31a and extension-side passages 31b through which the contraction-side chamber 11a and the extension-side chamber 11b are communicated. The contraction-side passages 31a and the extension-side passages 31b are respectively opened/closed by a contraction-side damping valve 40a and an extension-side damping valve 40b serving as damping force generating portions provided on the piston 30.

The rod 20 extends out from the cylinder 10 through the extension-side chamber 11b. The shock absorber 1 is contracted as the rod 20 enters the cylinder 10, while the shock absorber 1 is extended as the rod 20 moves out from the cylinder 10.

When the shock absorber 1 is contracted, the piston 30 is moved in the direction in which the volume of the contraction-side chamber 11a is reduced and the volume of the extension-side chamber 11b is increased. The contraction-side damping valve 40a is opened by a differential pressure between the contraction-side chamber 11a and the extension-side chamber 11b to open the contraction-side passages 31a, and the working oil flows from the contraction-side chamber 11a into the extension-side chamber 11b through the contraction-side passages 31a. At this time, resistance is imparted to the flow of the working oil by the contraction-side damping valve 40a, and thereby, the shock absorber 1 exhibits the damping force.

When the shock absorber 1 is extended, the piston 30 is moved in the direction in which the volume of the extension-side chamber 11b is reduced and the volume of the contraction-side chamber 11a is increased. The extension-side damping valve 40b is opened by the differential pressure between the extension-side chamber 11b and the contraction-side chamber 11a to open the extension-side passages 31b, and the working oil flows from the extension-side chamber 11b into the contraction-side chamber 11a through the extension-side passages 31b. At this time, resistance is imparted to the flow of the working oil by the extension-side damping valve 40b, and thereby, the shock absorber 100 exhibits the damping force.

As described above, along with the movement of the rod 20, the contraction-side damping valve 40a and the extension-side damping valve 40b impart the resistance to the flow of the working oil to generate the damping force.

The volume change in the cylinder 10 that is caused by the movement of the rod 20 is compensated for by a gas chamber 12 that is formed in the cylinder 10 by a free piston 50.

A rod guide 60 that supports the rod 20 via a bush 61 in a freely slidable manner is provided on an inner circumference of the cylinder 10. The rod guide 60 is supported by a retaining ring 62 provided in an inner circumference of the cylinder 10.

An opening end 13 of the cylinder 10 is bent radially inward of the cylinder 10 by a caulking process, and the seal member 100 that closes a gap between the cylinder 10 and the rod 20 is provided between the opening end 13 and the rod guide 60. In other words, the seal member 100 and the rod guide 60 are fixed to the cylinder 10 by being sandwiched between the opening end 13 of the cylinder 10 and the retaining ring 62.

Figure 2:
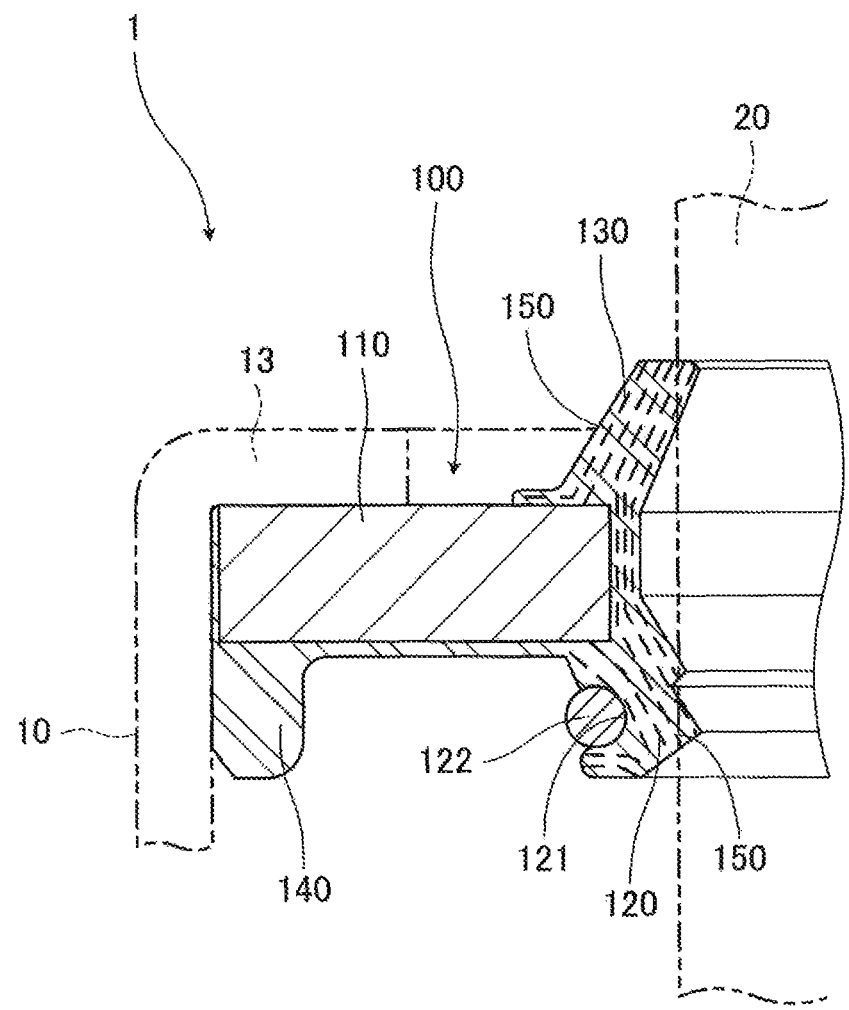
FIG. 2 is an enlarged sectional view of the seal member according to the embodiment of the present invention.

As shown in FIG. 2, the seal member 100 is provided with a base portion 110 that is held by the cylinder 10; and an oil lip portion 120 and a dust lip portion 130 serving as lip portions provided on the base portion 110. The base portion 110 is a metal plate formed to have an annular shape, and the rod 20 is inserted through the base portion 110.

The oil lip portion 120 is formed so as to project radially inward from the base portion 110 and so as to project in the direction in which the rod 20 enters the cylinder 10, and thereby, the oil lip portion 120 is brought into sliding contact with an outer circumference of the rod 20. When the shock absorber 1 is extended, the working oil that has deposited on the outer circumference of the rod 20 is scraped off by the oil lip portion 120 and remains within the cylinder 10. In other words, the oil lip portion 120 prevents the working oil from leaking out from the cylinder 10.

An annular-shaped groove portion 121 is formed in an outer circumference of the oil lip portion 120, and an annular-shaped garter spring 122 is mounted in the groove portion 121. By the garter spring 122, a tightness of the oil lip portion 120 against the rod 20 is ensured.

The dust lip portion 130 is formed so as to project radially inward from the base portion 110 and so as to project out in the direction in which the rod 20 moves out from the cylinder 10, and thereby, the dust lip portion 130 is brought into sliding contact with the outer circumference of the rod 20. When the shock absorber 1 is contracted, extraneous matters that are adhered to the outer circumference of the rod 20 is scraped off by the dust lip portion 130. In other words, the dust lip portion 130 prevents the extraneous matters from entering the cylinder 10. In the above, similarly to the oil lip portion 120, a garter spring may also be mounted on an outer circumference of the dust lip portion 130.

In addition, the seal member 100 has an outer circumference seal portion 140 that extends from the base portion 110 in the axial direction along the inner circumference of the cylinder 10 so as to have an annular shape. The outer circumference seal portion 140 closes a gap between an outer circumference of the base portion 110 and the inner circumference of the cylinder 10, and thereby, the leakage of the working oil and the entry of the extraneous matters through the gap are prevented.

The oil lip portion 120, the dust lip portion 130, and the outer circumference seal portion 140 are integrally formed by using a rubber material serving as an elastic body containing fibers 150 formed of polytetrafluoroethylene (PTFE), and these components are bonded to the base portion 110 through vulcanization. In FIG. 2, the fibers 150 are illustrated only in the oil lip portion 120 and the dust lip portion 130, and the illustration of the fibers 150 is omitted in other portions.

The fibers 150 are oriented in the axial direction in the oil lip portion 120. Thus, the rubber material forming the oil lip portion 120 is reinforced in the axial direction by the fibers 150. Therefore, the modulus of elasticity of the oil lip portion 120 in the radial direction and the circumferential direction becomes the same as the modulus of elasticity of the rubber material, whereas the modulus of elasticity of the oil lip portion 120 in the axial direction becomes higher than the modulus of elasticity of the rubber material. In other words, the modulus of elasticity of the oil lip portion 120 in the axial direction can be made higher than the modulus of elasticity of the oil lip portion 120 in the radial direction and the circumferential direction.

In addition, because the hardness and the modulus of elasticity are in a substantially proportional relationship, by improving the modulus of elasticity of the oil lip portion 120 in the axial direction, the hardness of the oil lip portion 120 in the direction along an inner circumferential surface of the oil lip portion 120 becomes higher than the hardness of the rubber material. Therefore, it is possible to reduce the wear of the oil lip portion 120 caused by the sliding movement of the rod 20 and to improve the wear resistance of the oil lip portion 120.

On the other hand, because the modulus of elasticity of the oil lip portion 120 in the circumferential direction and the radial direction can be kept low, it is possible to maintain the tightness of the oil lip portion 120 against the rod 20 weak. Therefore, the friction between the oil lip portion 120 and the rod 20 is not increased, and so, the smooth movement of the rod 20 is not interfered.

As described above, with the seal member 100, it is possible to improve the wear resistance of the oil lip portion 120 without interfering the smooth movement of the rod 20.

In addition, in the seal member 100, because the modulus of elasticity of the oil lip portion 120 in the axial direction is high, it is possible to reduce deformation of the oil lip portion 120 in the axial direction while the rod 20 is moved. Therefore, an oil film between the oil lip portion 120 and the rod 20 is stabilized. Thus, it is possible to reduce variation of the friction between the oil lip portion 120 and the rod 20, and at the same time, it is possible to prevent the leakage of the working oil by stabilizing a balance between a supplied amount and a scraped amount of the working oil between the oil lip portion 120 and the rod 20.

Also in the dust lip portion 130, the fibers 150 are oriented in the axial direction. Thus, it is possible to improve the wear resistance of the dust lip portion 130 without interfering the smooth movement of the rod 20. In addition, it is possible to reduce the deformation of the dust lip portion 130 in the axial direction while the rod 20 is moved. Therefore, it is possible to reduce variation of the friction between the dust lip portion 130 and the rod 20, and at the same time, it is possible to prevent the entry of the extraneous matters into the cylinder 10.

In the shock absorber 1, because the friction between the oil lip portion 120 and the rod 20 and between the dust lip portion 130 and the rod 20 can be reduced, it is possible to allow the rod 20 to be moved smoothly relative to the cylinder 10. Therefore, it is possible to make the influence of the friction between the oil lip portion 120 and the rod 20 and between the dust lip portion 130 and the rod 20 on the damping characteristic small. In addition, because the wear resistance of the oil lip portion 120 and the dust lip portion 130 can be improved, it is possible to improve the durability of the shock absorber 1.

The fibers 150 contained in the rubber material are not limited to the PTFE fibers. For example, the fibers 150 may be fibers of other types such as glass fibers, carbon fibers, and aramid fibers, and by orienting these fibers in the axial direction, it is possible to improve the wear resistance of the oil lip portion 120 without interfering the smooth movement of the rod 20.

Compared with the fibers such as the glass fibers, the carbon fibers, and the aramid fibers, the PTFE fibers have smaller fiber diameter and smaller friction coefficient. Thus, by using the PTFE fibers as the fibers 150, even in a case in which the fibers 150 are exposed from the rubber material and the fibers 150 are brought into sliding contact with the rod 20, it is possible to prevent the wear of the rod 20, and at the same time, it is possible to prevent an increase in the friction between the dust lip portion 130 and the rod 20.

The orientation of the PTFE fibers can be achieved by using a calendar roller, an extruder, an injection molding machine, or the like during a preforming or forming process of the rubber material. Specifically, pure PTFE powder capable of being made into fibers (fibrillated) is added to a rubber raw material and is dispersed therein by performing a kneading process. By doing so, the PTFE powder is made into the fibers. By charging the rubber material containing the PTFE fibers into the calendar roller, the extruder, or the injection molding machine and by molding it into a predetermined shape, the PTFE fibers are oriented. When the calendar roller is used, the PTFE fibers are oriented in the direction in which the rubber material is rolled. When the extruder is used, the PTFE fibers are oriented in the direction in which the rubber material is extruded. When the injection molding machine is used, the PTFE fibers are oriented in the direction in which the rubber material is injected.

It is preferable that an amount of the pure PTFE powder added be in a range from 0.5 parts by weight or more to 10 parts by weight or less per 100 parts by weight of the rubber raw material. If the added amount of the pure PTFE powder is less than 0.5 parts by weight, the rubber material is not reinforced sufficiently, and if the added amount exceeds 10 parts by weight, an extensibility of the rubber material is deteriorated.

For the elastic body, the rubber material having an unsaturated structure, such as a nitrile rubber (NBR) etc., and the rubber material having a saturated structure, such as a hydrogenated nitrile rubber (HNBR), a fluorocarbon rubber (FKM), a polyurethane rubber (AU, EU), and so forth, may be used. The rubber material having the unsaturated structure is inexpensive relative to the rubber material having the saturated structure. Thus, by forming the oil lip portion 120 and the dust lip portion 130 by using the rubber material having the unsaturated structure, it is possible to reduce production cost of the seal member 100.

The rubber material having the unsaturated structure is susceptible to deterioration by reaction with ozone in an atmosphere under the action of stress (low in an ozone resistance) compared with the rubber material having the saturated structure. In the oil lip portion 120 and the dust lip portion 130 of the seal member 100, the fibers 150 are oriented in the axial direction, and the tightness of the oil lip portion 120 and the dust lip portion 130 against the rod 20 is weak. Thus, the stress acting on the oil lip portion 120 and the dust lip portion 130 is small, and so, it is possible to reduce the reaction with ozone even if the rubber material having the unsaturated structure is used. Therefore, it is possible to reduce the deterioration of the oil lip portion 120 and the dust lip portion 130 while reducing the production cost of the seal member 100.

The embodiment described above affords the following effects.

In the seal member 100, the oil lip portion 120 and the dust lip portion 130 are formed of the elastic body containing the fibers 150 that have been oriented in the axial direction. Thus, it is possible to increase the modulus of elasticity of the oil lip portion 120 and the dust lip portion 130 in the axial direction while maintaining the modulus of elasticity of the oil lip portion 120 and the dust lip portion 130 in the radial direction and the circumferential direction low. Therefore, it is possible to increase the hardness of the oil lip portion 120 and the dust lip portion 130 without increasing the tightness of the oil lip portion 120 and the dust lip portion 130 against the rod 20. With such a configuration, it is possible to improve the wear resistance of the oil lip portion 120 and the dust lip portion 130 without interfering the smooth movement of the rod 20.

In addition, in the seal member 100, the fibers 150 are the PTFE fibers and have smaller fiber diameter, and thus, smaller friction coefficient compared with the fibers such as the glass fibers, the carbon fibers, and the aramid fibers. Thus, even if the fibers 150 are exposed from the elastic body and the fibers 150 are brought into sliding contact with the rod 20, it is possible to prevent the wear of the rod 20, and at the same time, it is possible to prevent the increase in the friction between the rod 20 and the oil lip portion 120 and between the rod 20 and the dust lip portion 130.

In addition, in the seal member 100, the elastic body is the rubber material having the unsaturated structure and is inexpensive. In the oil lip portion 120 and the dust lip portion 130, the fibers 150 are oriented in the axial direction, and so, the tightness of the oil lip portion 120 and the dust lip portion 130 against the rod 20 is weak and the stress acting on the oil lip portion 120 and the dust lip portion 130 is small. Thus, even if the oil lip portion 120 and the dust lip portion 130 are formed by using the rubber material having the unsaturated structure, it is possible to reduce the reaction between ozone and the rubber material of the oil lip portion 120 and the dust lip portion 130. Therefore, it is possible to reduce the deterioration of the oil lip portion 120 and the dust lip portion 130 while reducing the production cost of the seal member 100.

In addition, in the shock absorber 1, the gap between the cylinder 10 and the rod 20 is closed by the seal member 100. Thus, the friction between the oil lip portion 120 and the rod 20 and between the dust lip portion 130 and the rod 20 can be reduced, and so, it is possible to allow the rod 20 to be moved smoothly relative to the cylinder 10. Therefore, it is possible to make the influence of the friction between the oil lip portion 120 and the rod 20 and between the dust lip portion 130 and the rod 20 on the damping characteristic small. In addition, because the wear resistance of the oil lip portion 120 and the dust lip portion 130 can be improved, it is possible to improve the durability of the shock absorber 1.

The configurations, operations, and effects of the embodiments of the present invention will be collectively described below.

This embodiment relates to the seal member 100 that is provided in the shock absorber 1 provided with the cylinder 10 and the rod 20 inserted into the cylinder 10 so as to be movable in the axial direction, the seal member 100 being configured to close the gap between the cylinder 10 and the rod 20. The seal member 100 includes: the base portion 110 held by the cylinder 10, the base portion 110 being configured such that the rod 20 is inserted through the base portion 110; and the oil lip portion 120 and the dust lip portion 130 provided on the base portion 110, the oil lip portion 120 and the dust lip portion 130 being brought into sliding contact with the outer circumference of the rod 20, wherein the oil lip portion 120 and the dust lip portion 130 are formed of the elastic body containing the fibers 150 oriented in the axial direction.

In this configuration, the elastic body is reinforced by the fibers 150 in the axial direction. Thus, it is possible to increase the modulus of elasticity of the oil lip portion 120 and the dust lip portion 130 in the axial direction while maintaining the modulus of elasticity of the oil lip portion 120 and the dust lip portion 130 in the radial direction and the circumferential direction low. Therefore, it is possible to increase the hardness of the oil lip portion 120 and the dust lip portion 130 without increasing the tightness of the oil lip portion 120 and the dust lip portion 130 against the rod 20. With such a configuration, it is possible to improve the wear resistance of the oil lip portion 120 and the dust lip portion 130 without interfering the smooth movement of the rod 20.

In addition, in the seal member 100, the fibers 150 are the PTFE fibers.

In this configuration, the fibers 150 are the PTFE fibers, and so, they have small fiber diameter and small friction coefficient. Thus, even if the fibers 150 are exposed from the elastic body and the fibers 150 are brought into sliding contact with the rod 20, it is possible to prevent the wear of the rod 20, and at the same time, it is possible to prevent the increase in the friction between the rod 20 and the oil lip portion 120 and between the rod 20 and the dust lip portion 130.

In addition, in the seal member 100, the elastic body is the rubber material having the unsaturated structure.

In this configuration, the elastic body is the rubber material having the unsaturated structure and is inexpensive. In addition, in the oil lip portion 120 and the dust lip portion 130, the fibers 150 are oriented in the axial direction, and so, the tightness of the oil lip portion 120 and the dust lip portion 130 against the rod 20 is weak and the stress acting on the oil lip portion 120 and the dust lip portion 130 is small. Thus, even if the oil lip portion 120 and the dust lip portion 130 are formed by using the rubber material having the unsaturated structure, it is possible to reduce the reaction between ozone and the rubber material of the oil lip portion 120 and the dust lip portion 130. Therefore, it is possible to reduce the deterioration of the oil lip portion 120 and the dust lip portion 130 while reducing the production cost of the seal member 100.

In addition, the shock absorber 1 includes: the seal member 100; the cylinder 10 filled with the working oil; the rod 20 inserted into the cylinder 10 so as to be freely movable in the axial direction; and the contraction-side damping valve 40a and the extension-side damping valve 40b received in the cylinder 10, the contraction-side damping valve 40a and the extension-side damping valve 40b being configured to generate the damping force by imparting the resistance to the flow of the working oil as the rod 20 is moved.

In this configuration, the gap between the cylinder 10 and the rod 20 is closed by the seal member 100. Thus, the friction between the oil lip portion 120 and the rod 20 and between the dust lip portion 130 and the rod 20 can be reduced, and so, it is possible to allow the rod 20 to be moved smoothly relative to the cylinder 10. Therefore, it is possible to make the influence of the friction between the oil lip portion 120 and the rod 20 and between the dust lip portion 130 and the rod 20 on the damping characteristic small. In addition, because the wear resistance of the oil lip portion 120 and the dust lip portion 130 can be improved, it is possible to improve the durability of the shock absorber 1.

The embodiments of the present invention described above are merely illustration of some application examples of the present invention and the technical scope of the present invention is not limited to the specific constructions of the above embodiments.

In the above-mentioned embodiment, although the working oil is used as the working fluid, non-compressive fluid such as water, aqueous solution, and so forth may also be used instead of the working oil.

In the above-mentioned embodiment, although a description has been given of, as the shock absorber 1, a single-tube shock absorber, in which the contraction-side chamber 11a, the extension-side chamber 11b, and the gas chamber 12 are formed in the cylinder 10, the shock absorber 1 may be a twin-tube shock absorber in which an outer tube is provided on an outer circumference of an inner tube serving as the cylinder and a reservoir is formed between the inner tube and the outer tube.

In addition, in the above-mentioned embodiment, although a description has been given of the seal member 100 used in the shock absorber 1, the present invention may also be applied to a seal member used in the fluid pressure apparatus such as a fluid pressure cylinder etc.

This application is based on and claims priority to Japanese Patent Application No. 2018-045033 filed in Japan Patent Office on Mar. 13, 2018, the entire content of which is incorporated herein by reference.

The invention claimed is:

1. A seal member provided in a fluid pressure apparatus including a cylinder and a rod inserted into the cylinder so as to be movable in an axial direction of the cylinder, the seal member for closing a gap between the cylinder and the rod, the seal member comprising:
   a base portion held by the cylinder, the base portion being configured such that the rod is inserted through the base portion; and
   a lip portion provided on the base portion and projecting radially inward, the lip portion being in sliding contact with an outer circumference of the rod when the rod is moved in the axial direction, wherein
   the lip portion is formed of an elastic body containing fibers oriented in the axial direction and
   a modulus of elasticity of the lip portion in both a radial direction and a circumferential direction of the cylinder is lower than a modulus of elasticity of the lip portion in the axial direction.

2. The seal member according to claim 1, wherein the fibers are polytetrafluoroethylene fibers.

3. The seal member according to claim 1, wherein the elastic body is a rubber material having an unsaturated structure.

4. A shock absorber comprising:
   the seal member according to claim 1;
   the cylinder filled with working fluid;
   the rod inserted into the cylinder so as to be freely movable in the axial direction; and
   a damping force generating portion received in the cylinder, the damping force generating portion being configured to generate a damping force by imparting resistance to a flow of the working fluid as the rod is moved.

5. The seal member according to claim 1, wherein the lip portion includes a first lip and a second lip which respectively project radially inward and respectively extend in different directions so that an end portion of the first lip and an end portion of the second lip are spaced from each other in the axial direction.

* * * * *